United States Patent
Park et al.

(10) Patent No.: US 8,199,104 B2
(45) Date of Patent: Jun. 12, 2012

(54) CHARACTER INPUT DEVICE USING BIO RADAR UNIT AND TILT SENSOR

(75) Inventors: Kyu-Ho Park, Gongju (KR); Ki-Woong Park, Daejeon (KR); Sung-Ahn Ko, Daejeon (KR)

(73) Assignee: Korea Advanced Institute of Science and Technology, Daejeon-si (KR)

( * ) Notice: Subject to any disclaimer, the term of this patent is extended or adjusted under 35 U.S.C. 154(b) by 819 days.

(21) Appl. No.: 12/027,585

(22) Filed: Feb. 7, 2008

(65) Prior Publication Data
US 2008/0291158 A1    Nov. 27, 2008

(30) Foreign Application Priority Data

May 21, 2007 (KR) .......................... 10-2007-0049091

(51) Int. Cl.
G09G 5/00 (2006.01)

(52) U.S. Cl. ........................................ 345/156; 345/158

(58) Field of Classification Search .................. 345/168, 345/169, 156
See application file for complete search history.

(56) References Cited

U.S. PATENT DOCUMENTS

| 5,880,712 A * | 3/1999 | Goldman ...................... 345/168 |
| 6,965,374 B2 * | 11/2005 | Villet et al. .................. 345/169 |
| 2005/0264527 A1 * | 12/2005 | Lin ............................... 345/156 |

FOREIGN PATENT DOCUMENTS

| KR | 2003039648 | 5/2003 |
| KR | 20030092175 | 12/2003 |
| KR | 1020070036458 | 4/2007 |

* cited by examiner

*Primary Examiner* — Quan-Zhen Wang
*Assistant Examiner* — Troy Dalrymple
(74) *Attorney, Agent, or Firm* — H.C. Park & Associates, PLC (57) ABSTRACT

Disclosed herein is a character input device for a mobile device or a wearable terminal. A bio radar unit senses the positions of the fingers of a user. A tilt sensor senses the tilt of the hands of the user. A microprocessor calculates the final input information of the user by processing signals received from the bio radar unit and the tilt sensor. A wireless communication module transmits the final input information to the mobile device or the wearable terminal of the user. A speaker device outputs a feedback sound corresponding to the final input information of the user. The character input device is wearable on a wrist of the user. The bio radar unit transmits a signal, measures the distance between the character input device and a finger by measuring the strength of a reflected wave reflected from the finger with which the signal collides, and measures the angle of the finger related to activation.

6 Claims, 7 Drawing Sheets

CHARACTER INPUT DEVICE USING BIO RADAR UNIT AND TILT SENSOR

BACKGROUND OF THE INVENTION

1. Field of the Invention

The present invention relates generally to a character input device, and, more particularly, to a character input device for a mobile device or a wearable terminal, which does not require the use of a keyboard.

2. Description of the Related Art

Generally, 'radar', which is an abbreviation for 'RAdio Detection And Ranging', is a system that was developed during World War II and has been used as auxiliary equipment for Air Traffic Control (ATC) and aircraft precision approach. Radar has been installed in airports by the U.S. Federal Aviation Administration (FAA) since the end of the 1940s, and has become major equipment for ATC nowadays.

Radar has an operating principle in which, when radio energy (a short pulse) is emitted from a directional antenna and collides against a target object, waves are reflected, that is, part of the energy returns, and the direction of the target object can be detected using a device for receiving and detecting a reflected waves. That is, radar is equipment for transmitting a radio wave to a target object, receiving the reflected waves of the energy of the radio waves, and measuring the position (direction and distance) of the target object using the round-trip time and the directional characteristics of an antenna based on the straightness and isochronism of a radio wave. Therefore, in the omni-directional emission/reception of a radio wave from/through a ground antenna, the time required for emission/reception is proportional to distance, so that the position of a target object and the distance to the target object can be detected using the direction to the target object. This has been used for the operating principle of distance measurement equipment.

With the development of System On a Chip (SOC) technology, radar devices have become ultra small and use low power. Therefore, bio radar devices for sensing the pulse and breath of humans have been commercialized, and radar devices can be applied to mobile devices.

A keyboard is an input device through which a user can input commands and data into a computer. When characters to be used in a computer are defined in the ROM of a keyboard and a user presses a key, the keyboard transmits the value of the corresponding key to the computer. The keyboard is classified as a QWERTY keyboard or a Dvorak keyboard based on the arrangement of input keys. The QWERTY keyboard is the most commonly used keyboard, and takes its name from the first six letters seen in the keyboard's top first row of letters, that is, 'Q, W, E, R, T, and Y'.

Figure 1:
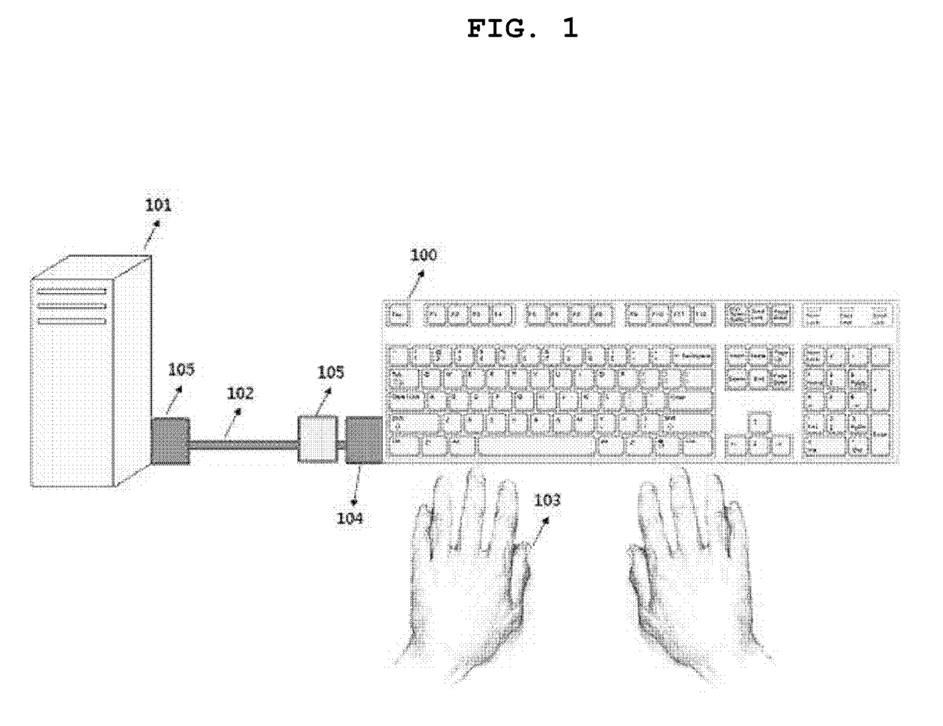
FIG. 1 is a view showing the construction of a keyboard used for a general computer and a connection between the keyboard and the computer.

FIG. 1 is a view showing the construction of a keyboard 100 used for a general computer 101 and a connection 102 between the keyboard 100 and the computer 101. The conventional keyboard 100 is manufactured on the basis of the desktop computer 101, so that the keyboard 100 includes at least 80 keys. Therefore, there are problems in that the keyboard is large and inconvenient to carry. As shown in FIG. 1, the conventional character input device 100 includes a keyboard for receiving characters from a user 103, and a microprocessor 104 provided inside the keyboard to sense a character input by the hand of the user and transmit information about the character to the computer 101. The information about a character is transmitted to the computer 101 in a Universal Serial Bus (USB) or Personal System 2 (PS/2) manner (refer to reference numeral 105). The PS/2 or USB port of the computer, which has received the information about the character, generates an interrupt whenever data is received from the keyboard 100, and informs the computer 101 of the presence of input information. The above-described character input device 100 is suitable for a fixed computer environment. However, when the character input device 100 is applied to a mobile device or a wearable device, which requires the user 103 to perform an input operation while moving, there is a disadvantage in that the usefulness of the character input device 100 is decreased by the low portability of the character input device. Further, there is a disadvantage in that the portability of the character input device is decreased because a user must always carry a character input device 100.

Figure 2:
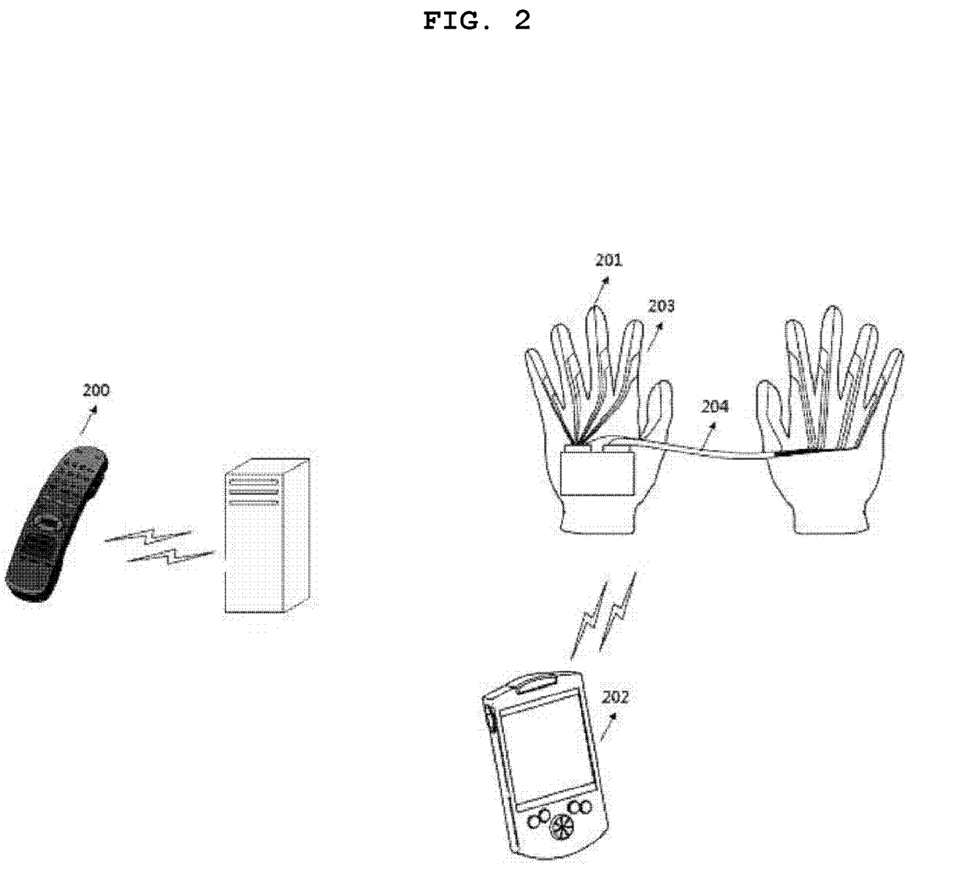
FIG. 2 is a view showing an input device according to a prior invention.

In order to overcome the above-described problems, various character input devices have been developed. FIG. 2 is a view showing an input device according to a prior invention.

Referring to FIG. 2, in order to solve the problem of the poor portability of the existing character input device, Korean Unexamined Patent Publication No. 10-2003-0092175 (entitled "Portable Keyboard") discloses a portable keyboard 200, which substitutes a small number of keys for the existing keys, thereby being easily carried, and which is integrated with a mouse, thereby enabling an input operation to be performed with one hand. However, there are disadvantages in that a user must always hold the character input device 200, so that the degree of freedom of the hand holding the character input device deteriorates, and a large amount of learning is required to learn the input method of the corresponding keyboard 200.

Further, in order to solve the problems of the portability and usefulness of a keyboard, Korean Unexamined Patent Publication No. 10-2007-0036458 (entitled "Data Input Device using Gloves") and Korean Unexamined Patent Publication No. 10-2003-0039648 (entitled "Wearable Glove-type Character Input Device") disclose gloves that are configured such that, when a terminal, such as a mobile device or a wearable device, is used, a user wears a glove-type key input device 201 having a plurality of contacts, instead of using a keyboard mounted in a device, and inputs data required to execute a program via a wired/wireless connection 202. However, there is a disadvantage in that it is bothersome to input characters because a user must put on the gloves 201 in order to input characters, and there is a defect in that the degree of freedom of both hands deteriorates because sensors 203 are attached to the joints of fingers and both hands are connected via a wired connection 204.

SUMMARY OF THE INVENTION

Accordingly, the present invention has been made keeping in mind the above problems occurring in the prior art, and an object of the present invention is to provide a character input device, which detects character information, input by a user, using a bio radar unit, so that characters can be rapidly and accurately input in the same manner as the existing keyboard, and which enables special keys, such as directional keys, frequently used by a user, to be intuitively activated using a tilt sensor, thus being suitable for a mobile device or a wearable computing device.

In order to accomplish the above object, the present invention provides a character input device for a mobile device or a wearable terminal, including a bio radar unit for sensing the positions of the fingers of a user; a tilt sensor for sensing the tilt of the hands of the user; a microprocessor for calculating the final input information of the user by processing signals received from the bio radar unit and the tilt sensor; and a wireless communication module for transmitting the final input information to the mobile device or the wearable terminal of the user.

Here, the character input device is formed to be wearable on the wrist of the user.

Further, the character input device further includes a speaker device for outputting a feedback sound corresponding to the final input information of the user.

Furthermore, the bio radar unit transmits a signal, measures the distance between the character input device and a finger by measuring the strength of a reflected wave reflected from the finger with which the signal collides, and measures the angle of the finger used for activation.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Embodiments of the present invention will be described in detail with reference to the attached drawings below.

Figure 3:
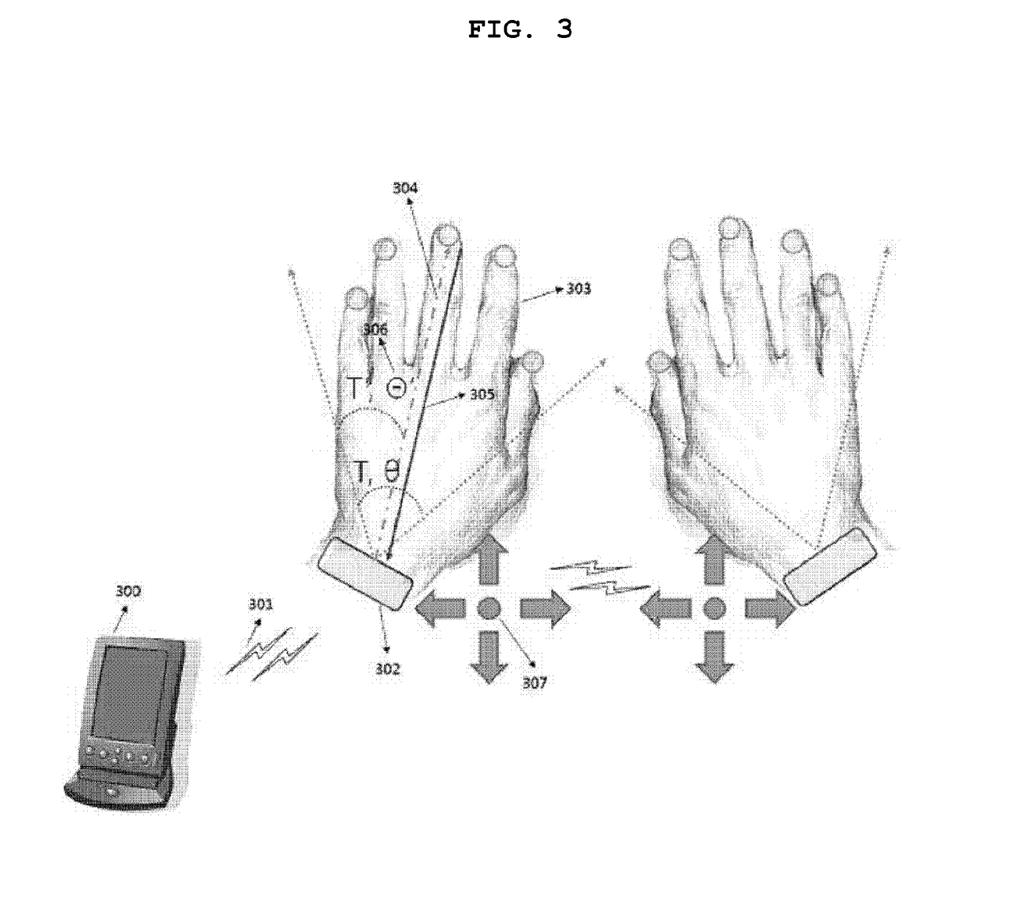
FIG. 3 is a view showing the construction of a character input device according to the present invention.

FIG. 3 is a view showing the construction of a character input device according to the present invention.

Referring to FIG. 3, the construction related to the present invention includes a mobile device or a wearable terminal 300, and an input device 302 for sensing a final input character intended to be input by the user by sensing the position of the user's hand, input information, and the tilt of the user's hand, and transmitting the final input character to the mobile device or the wearable terminal 300 via a wireless connection 301.

The input device 302 emits a radar signal 304 through the internal antenna of the input device 302, measures the strength of a reflected wave 305 generated when the radar signal 304 collides with one of the ten fingers 303 of the user for inputting a character, and measures the distance between the input device 302 and the finger 303. The angle θ' 306 of the finger used to perform an input operation is measured by the following Equation 1:

$$\theta' = \frac{\theta \cdot T'}{T} \quad (1)$$

Meanwhile, in order to enable the input of special keys, such as directional keys, to be easily performed, it is characterized in that the input device 302 detects special keys through a tilt sensor 307 when a user does not perform an input operation but tilts the hand, as shown in the following Table 1.

TABLE 1

| Left Hand | | Right Hand | |
| --- | --- | --- | --- |
| Tilt | Special Key | Tilt | Special Key |
| ↑ | Home | ↑ | Up |
| ↓ | End | ↓ | Down |
| ← | Back Space | ← | Left |
| → | Space | → | Right |
| Both Left and Right Hands ↑ | | Page Up | |
| Both Left and Right Hands ↓ | | Page Down | |

In the above table, the upper directional arrow indicates the case in which a fingertip is raised above a wrist, and the down directional arrow indicates the case in which a fingertip is tilted below a wrist.

The cases of the right and left direction arrows are also determined based on a wrist. The reason for this is that the input device 302 is worn on the wrist, so that the input of special keys is determined based on the input device 302.

Meanwhile, if both the left hand and the right hand are raised, it is determined that a 'Page Up' key is input. If both the left hand and the right hand are lowered, it is determined that a 'Page Down' key is activated.

Figure 4:
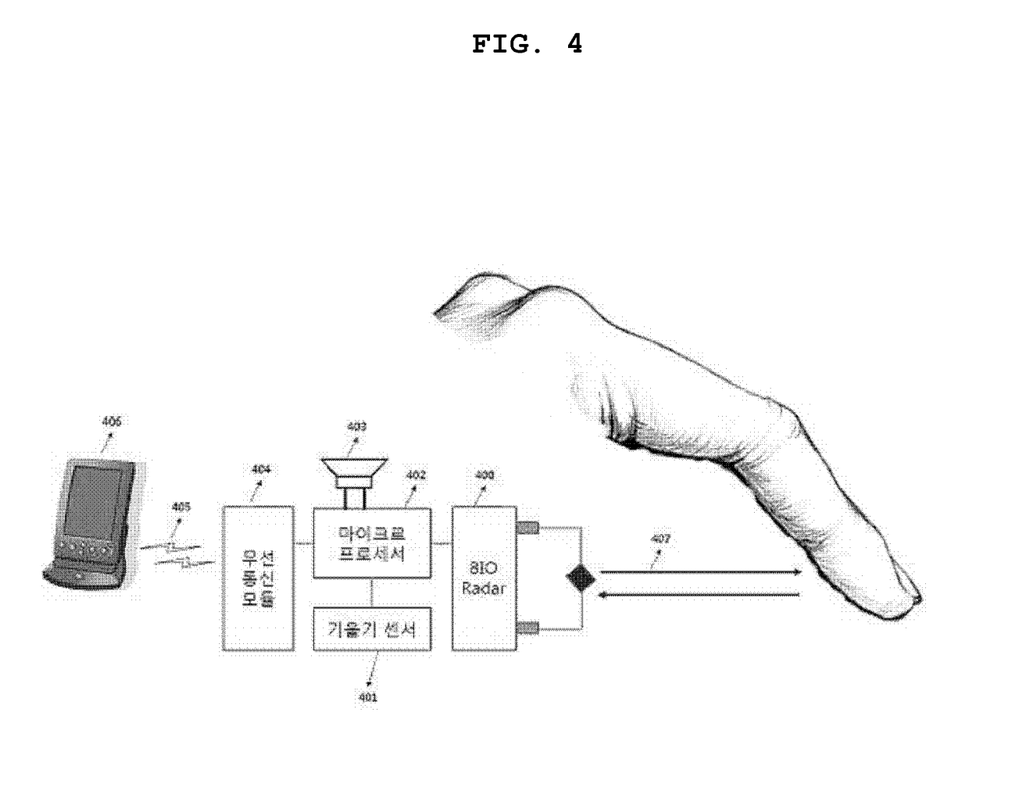
FIG. 4 is a view showing the internal construction and connection of the character input device according to the present invention.

The detailed construction of the above-described input device 302 is shown in FIG. 4. Referring to FIG. 4, the input device 302 includes a bio radar unit 400 for detecting the position of the finger of a user and input information, a tilt sensor 401 for enabling a user to activate special keys, a microprocessor 402 for detecting the final input information of the user by analyzing signals received from the tilt sensor 401 and the bio radar unit 400, and a wireless communication module 404 for transmitting the final input information to the mobile device or the wearable terminal 406 of the user via a wireless connection 405.

The input device 302 may further include a speaker device 403 for providing the feedback of an input character to the user.

First, the bio radar unit 400 measures a reflected wave signal 407 reflected from a finger, and transmits numerical values, related to the strength of the reflected wave and the angle of the finger, to the microprocessor 402.

When no information is input through the bio radar unit 400 but the tilt of a fingertip is sensed, the tilt sensor 401 transmits the value of a corresponding special key, shown in Table 1, to the microprocessor 402.

The microprocessor 402 determines the value of a character or a special key corresponding to the movement of a fingertip or a hand by analyzing data received from the bio radar unit 400 and the tilt sensor 401, and transmits the determined value of the character to the wireless communication module 404.

The wireless communication module 404 transmits data, received from the microprocessor 402, to the mobile device or the wearable terminal 406 via the wireless connection 405.

The speaker device 403 outputs a corresponding effect sound based on final input information obtained through the analysis of the microprocessor 402, or outputs the sound of a corresponding character, thereby enabling a user to confirm the input character.

Figure 5:
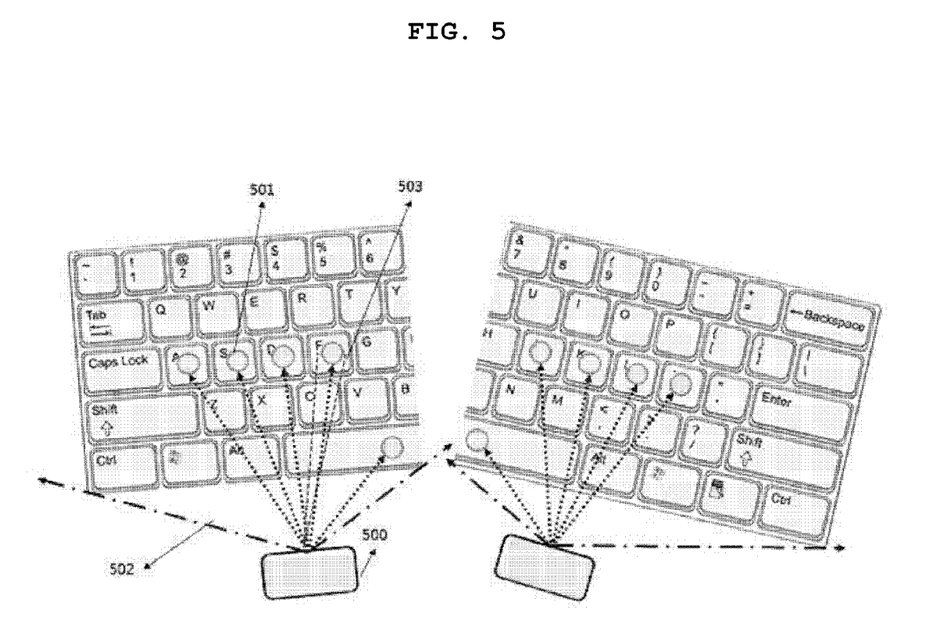
FIG. 5 is a view showing a method of detecting a final input character using a bio radar unit in the character input device according to the present invention.

FIG. 5 is a view showing a method of detecting a final input character using the bio radar unit in the character input device. Referring to FIG. 5, a user places fingers on corresponding positions based on the standard of a QWERTY keyboard so as to use the input device 500, and the bio radar unit obtains the value of the initial set position 501 of each of the fingers through scanning. In the process of obtaining the value of the initial set position 501, the input device 500 performs mapping between an initial range value 502 based on the position of a user finger and the coordinates 501 of an actual keyboard, and stores fingertip thickness information 503 when a finger is placed on each of the keys. Theses pieces of information are called 'reference information'. The initially set reference information is stored in the microprocessor or a separate memory device provided in the input device.

Figure 6:
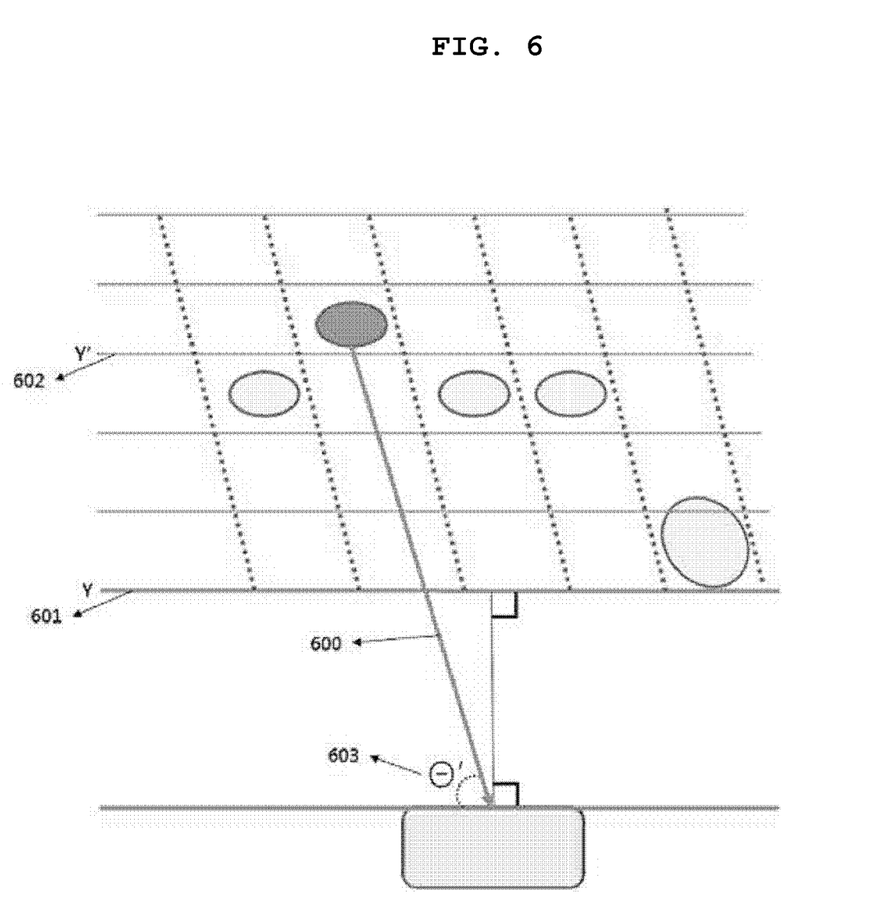
FIGS. 6 and 7 are views showing a process of obtaining character input information from a user according to the present invention.

FIG. 6 is a view showing a process of obtaining character input information using the value of the initial set position 501 of the finger, which is acquired, as shown in FIG. 5. A measured value Y' 602 is obtained by obtaining Y-axis value 601 using the strength of a reflected wave 600 corresponding to a signal emitted from the bio radar unit, and an angle θ' 603 can be obtained using the ratio of a detected time period T' to a total period T, as shown in the Equation 1.

The microprocessor calculates the coordinates of input information using the obtained Y' 602 and θ' 603, and compares the calculated coordinates with the initially set reference information, thereby determining the character that is desired to be input.

Figure 7:
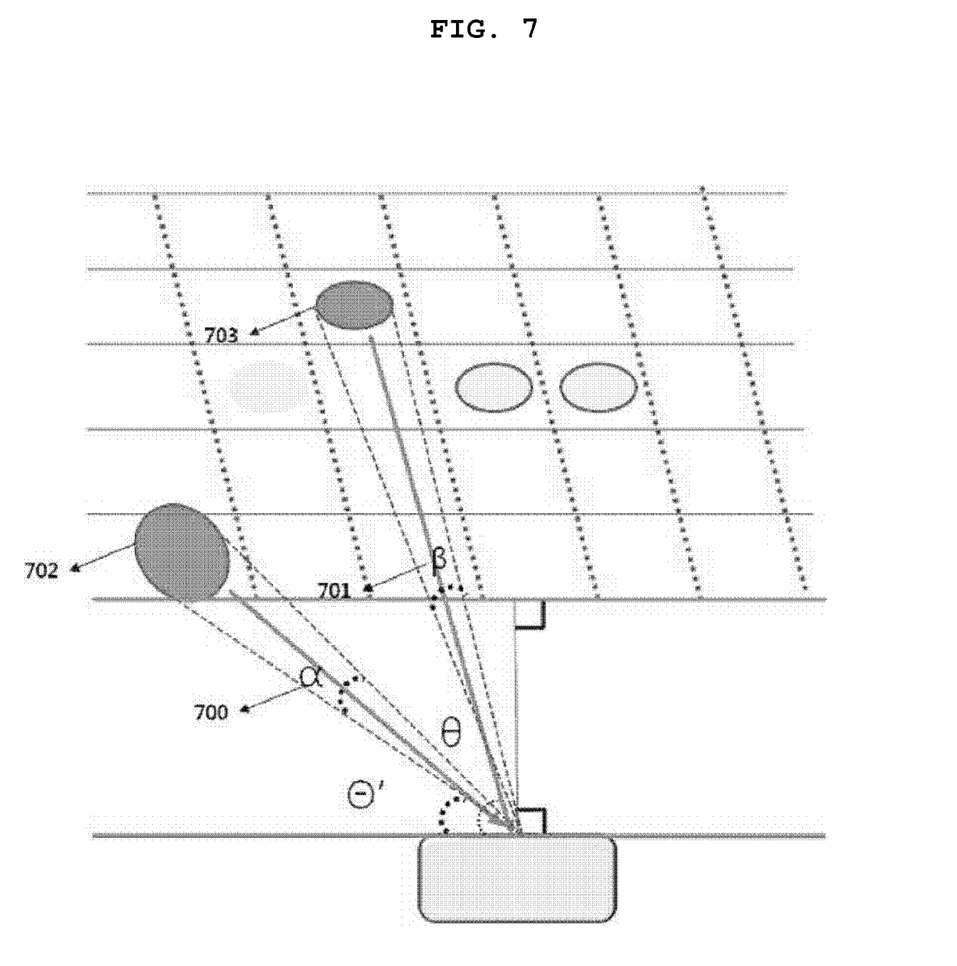

FIG. 7 is a view showing a method of detecting a finger in the case in which two or more fingers of a user are detected to be used for input. If three or more fingers are detected, this case is processed as a character input error and the detection of input is not performed. If two fingers are detected, a single finger that is actually intended to be used for input by the user should be detected. Therefore, the fingertip thickness information 503 of the respective fingers, stored as the initially set value obtained, as shown in FIG. 5, is compared with fingertip thickness information of the two input fingers 702 and 703, and thus the input character is detected using the following Equation.

It is assumed that reference fingertip thickness information for the two fingers is 'a' and 'b', and currently detected fingertip thickness information is α 700 and β 701. If $$\frac{\alpha}{a} \geq \frac{\beta}{b},$$

a finger corresponding to 'a' is detected as final input information. If $$\frac{\alpha}{a} < \frac{\beta}{b},$$

a finger corresponding to 'b' is detected as finally input information.

Although the character input device according to the present invention has been described in conjunction with the illustrative drawings, the present invention is not limited thereto, but variations and modifications can be made without departing from the scope and technical spirit of the invention.

The character input device constructed as described above according to the present invention removes the limitation in which the existing hardware keyboard and the hands of a person who performs an input operation should be placed on a support surface, so that characters can be input using the same method as those of the existing keyboard in motion. Further, special keys, such as directional keys, which are frequently used by a user, can be intuitively input using a tilt sensor so that a character input device suitable for a mobile device or a wearable computing device can be implemented.

What is claimed is:

1. A character input device for a mobile device or a wearable terminal, comprising:
 a bio radar unit configured to transmit a signal toward a fingertip of a finger of a user and to measure the strength of a signal reflected from the fingertip;
 a tilt sensor configured to sense a tilt of hands of the user;
 a microprocessor configured to calculate final input information of the user by processing signals received from the bio radar unit and the tilt sensor; and
 a wireless communication module configured to transmit the final input information to the mobile device or the wearable terminal of the user, wherein,
 the microprocessor is configured to calculate a direction of the finger, based on a ratio between a total scan period of the bio radar unit and a period of time taken to perceive the fingertip, and to calculate a distance to the fingertip, based on the strength of the reflected signal,
 the microprocessor is configured to detect the input of a special key according to the tilt measured by the tilt sensor,
 the microprocessor, when three or more of the fingers are detected as input, is configured to process this case as a character input error and not determine the input character,
 the microprocessor, when two of the finders are detected as input, is configured to detect fingertip thickness information of each of the fingers, and to obtain final input information by comparing the detected fingertip thickness information to the fingertip thickness information of the reference information,
 when $$\frac{\alpha}{a} \geq \frac{\beta}{b},$$

a finger corresponding to 'a' is detected as input information and when $$\frac{\alpha}{a} < \frac{\beta}{b},$$

a finger corresponding to 'b' is detected as input information, where a and b represent reference fingertip thickness information for the two fingers, and α and β represent detected fingertip thickness information.

2. The character input device as set forth in claim 1, wherein the character input device is formed to be wearable on a wrist of the user.

3. The character input device as set forth in claim 1, further comprising a speaker device configured to output a feedback sound corresponding to the final input information of the user.

4. The character input device as set forth in claim 1, wherein the bio radar unit is configured to measure the direction of the finger by detecting an angle of the finger relative to the bio radar unit.

5. The character input device as set forth in claim 1, wherein the microprocessor, when no input activation is performed by a finger, is configured to detect the input of the special key, based on the following table:

| Left Hand | | Right Hand | |
|---|---|---|---|
| Tilt | Special Key | Tilt | Special Key |
| ↑ | Home | ↑ | Up |
| ↓ | End | ↓ | Down |
| ← | Back Space | ← | Left |

-continued

| Left Hand | | Right Hand | |
|---|---|---|---|
| Tilt | Special Key | Tilt | Special Key |
| → | Space | → | Right |
| Both Left and Right Hands ↑ | | | Page Up |
| Both Left and Right Hands ↓ | | | Page Down. |

6. The character input device as set forth in claim 1, wherein the microprocessor is configured to previously store reference information, comprising coordinate values corresponding to respective positions of keys on a virtual keyboard, initial range values detectable based on positions of fingers of the user, and fingertip thickness information obtained when fingers are placed on the keys of the keyboard, and to determine an input character by comparing the stored reference information with the detected input information.

* * * * *